W. E. DAVIS.
Electro Magnet.
No. 96,554.
Patented Nov. 9, 1869.
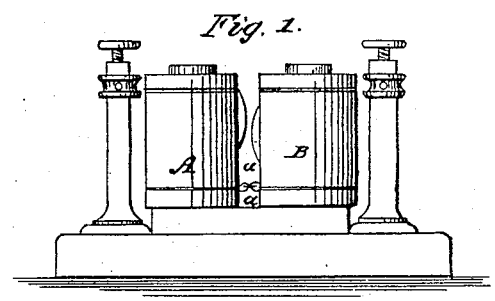
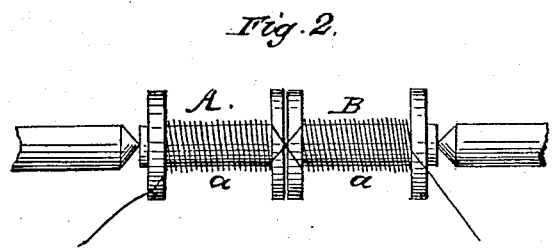

United States Patent Office.

WILLIAM EDWARD DAVIS, OF JERSEY CITY, NEW JERSEY.

Letters Patent No. 96,554, dated November 9, 1869.

IMPROVED ELECTRO-MAGNET.

The Schedule referred to in these Letters Patent and making part of the same.

To all whom it may concern:

Be it known that I, WILLIAM EDWARD DAVIS, of Jersey City, in the county of Hudson, and State of New Jersey, have invented a new and improved Electro-Magnet; and I do hereby declare that the following is a full, clear, and exact description thereof, which will enable others skilled in the art to make and use the same, reference being had to the accompanying drawing, forming part of this specification.

Figure 1 represents a side elevation of my improved magnet.

Figure 2 is a plan or top view of the same, showing the cores in position for receiving the wire.

Similar letters of reference indicate corresponding parts.

The object of this invention is to so construct the spools or cores of electro-magnets, by a new system of winding the wires around them, that the electric current will move rapidly, and uniformly enter both spools, and thereby produce a more decisive action upon the same and the armature.

Heretofore, the wire was first wound entirely around one spool, and then carried to the other, and then wound upon the same. The current, consequently, passed first around one spool, left it then, and passed to the other. One spool only was thereby electrified at the time, and the other tended to, more or less, counteract its effect. By my new system of applying the wire, both spools will at once receive the current, which passes alternately from one to the other. Greater power and quicker action are thereby obtained from the same battery, which, under the old system, would almost be insufficient.

My invention consists in winding the wire upon both spools, A B, at once, while the same are placed in line as in fig. 2, so that their ends are in contact, or nearly so.

The wire is started at the outer end of the spool A, wound upon said spool in one layer, carried over to the next spool B, and wound to the outer end of that. It is then wound back on the spool B, and carried over to A, and wound back on that, and in this manner it is continuously wound back and forth. Thereby many connections are produced between the two coils, and the wire is not continuously wound upon each spool, but is equally distributed. The spools are then set up in the ordinary manner, as in fig. 1.

When the electric current is passed through the wire a, such current will be equally distributed at the same time to both spools, and both will, therefore, at once act on the armature. The action will, therefore, be more sudden and powerful, and still of equal duration, as by the old process.

The same invention is applicable to all kinds of electro-magnets, whether spools, cores, or legs are employed.

Having thus described my invention,

I claim as new, and desire to secure by Letters Patent—

An electro-magnet, which has the wire wound in alternate layers upon the spools or cores, so that it will pass back and forth between them, substantially as and for the purposes herein shown and described.

WILLIAM EDWARD DAVIS.

Witnesses:
   GEO. W. MABEE,
   ALEX. F. ROBERTS.